United States Patent
Kim

(10) Patent No.: US 9,980,132 B2
(45) Date of Patent: May 22, 2018

(54) METHOD FOR DETECTING MESSAGES AND CALL REQUEST AND ELECTRONIC DEVICE ADAPTED THERETO

(71) Applicant: Samsung Electronics Co., Ltd., Suwon-si, Gyeonggi-do (KR)

(72) Inventor: Kyuhyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/638,491

(22) Filed: Mar. 4, 2015

(65) Prior Publication Data

US 2015/0257005 A1    Sep. 10, 2015

(30) Foreign Application Priority Data

Mar. 6, 2014  (KR) .................. 10-2014-0026756

(51) Int. Cl.
| | |
|---|---|
| *H04W 12/06* | (2009.01) |
| *H04W 4/14* | (2009.01) |
| *H04M 1/725* | (2006.01) |
| *H04W 88/02* | (2009.01) |

(52) U.S. Cl.
CPC ....... *H04W 12/06* (2013.01); *H04M 1/72552* (2013.01); *H04M 1/72577* (2013.01); *H04W 4/14* (2013.01); *H04M 2250/12* (2013.01); *H04W 88/02* (2013.01)

(58) Field of Classification Search
CPC ......... H04W 12/12; H04W 4/14; H04W 4/24; H04W 4/16

USPC ................. 455/450, 466, 467, 566
See application file for complete search history.

(56) References Cited

U.S. PATENT DOCUMENTS

| | | | |
|---|---|---|---|
| 7,058,417 B2 * | 6/2006 | Jeong ............................ | 455/466 |
| 8,966,074 B1 * | 2/2015 | Richards ................ | H04L 43/08 709/224 |
| 2010/0099448 A1 * | 4/2010 | Yim ................ | H04M 1/274516 455/466 |
| 2010/0311396 A1 * | 12/2010 | Kim .................. | H04M 3/42195 455/414.1 |
| 2011/0176537 A1 * | 7/2011 | Lawson et al. ................ | 370/352 |
| 2011/0283260 A1 * | 11/2011 | Bucuvalas .......... | G06F 11/3664 717/124 |
| 2012/0044867 A1 * | 2/2012 | Faccin et al. .................. | 370/328 |
| 2012/0151588 A1 * | 6/2012 | Wang ...................... | H04L 51/12 726/24 |
| 2012/0185495 A1 * | 7/2012 | Lim et al. ...................... | 707/758 |
| 2013/0183924 A1 * | 7/2013 | Saigh .................... | H04W 4/025 455/404.2 |

(Continued)

FOREIGN PATENT DOCUMENTS

KR    10-2013-0080831 A    7/2013

*Primary Examiner* — Jean Gelin
(74) *Attorney, Agent, or Firm* — Jefferson IP Law, LLP

(57) ABSTRACT

Methods for detecting a request for transmission/reception of messages and a call request are provided. The method includes recognizing a request from one of the request for transmission of the message or the request for the call, determining whether the recognized request is created by a user's input, outputting an alert pop-up window when the recognized request is not created by the user's input, and determining whether to one of transmit the message or make the call, in response to another input of the user applied to the alert pop-up window.

11 Claims, 6 Drawing Sheets

(56) References Cited

U.S. PATENT DOCUMENTS

2013/0333047 A1\* 12/2013 Gibson ............... G06Q 10/107
                                                                            726/26
2014/0134969 A1\* 5/2014 Jin et al. .................... 455/404.1
2014/0179360 A1\* 6/2014 Jackson et al. ............... 455/466
2014/0274172 A1\* 9/2014 Ludwig et al. ............... 455/466

\* cited by examiner

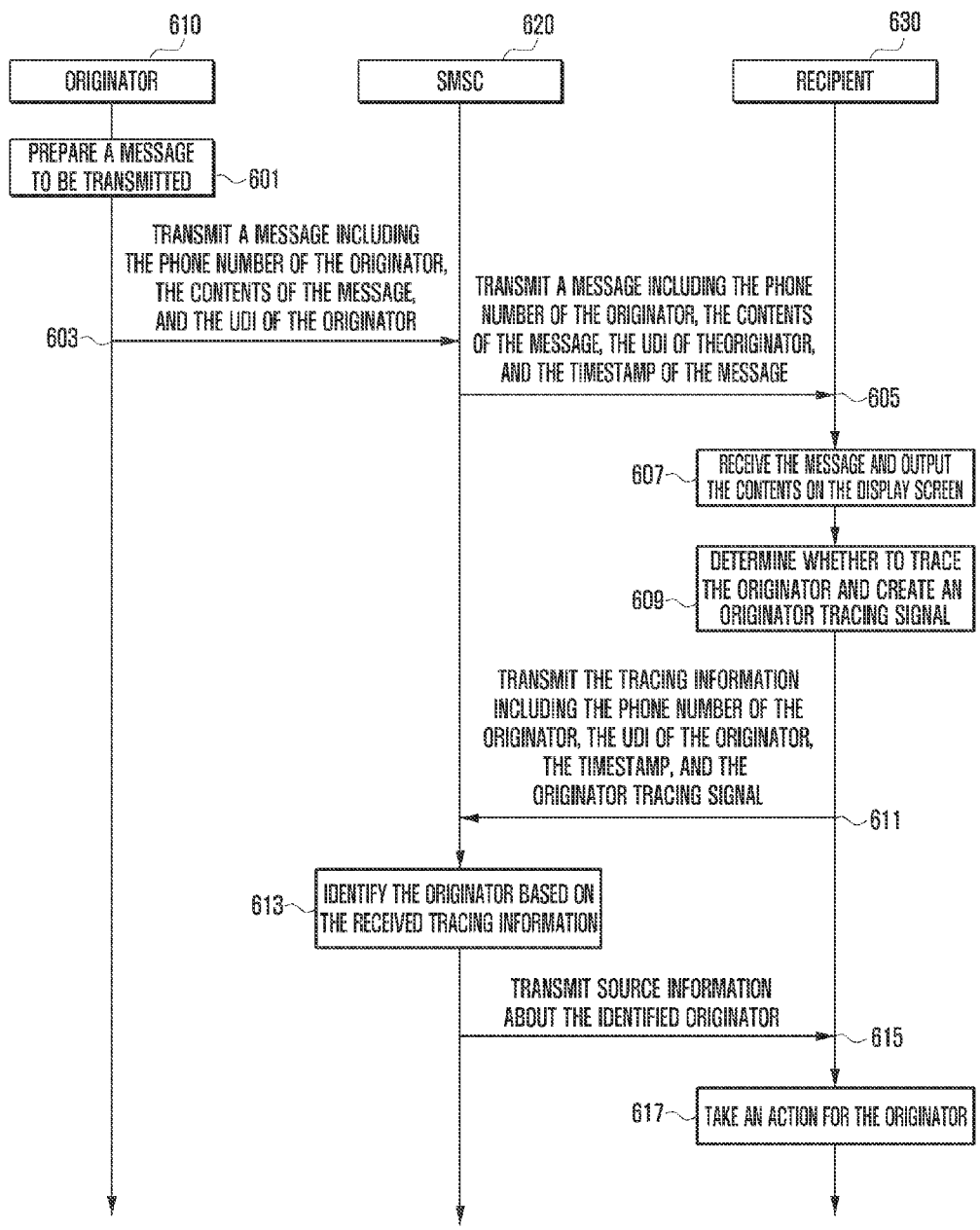

METHOD FOR DETECTING MESSAGES AND CALL REQUEST AND ELECTRONIC DEVICE ADAPTED THERETO

CROSS-REFERENCE TO RELATED APPLICATION(S)

This application claims the benefit under 35 U.S.C. § 119(a) of a Korean patent application filed on Mar. 6, 2014 in the Korean Intellectual Property Office and assigned Serial number 10-2014-0026756, the entire disclosure of which is hereby incorporated by reference.

TECHNICAL FIELD

The present disclosure relates to a method for detecting a request for transmission/reception of messages and a call request and an electronic device adapted to the method.

BACKGROUND

When an electronic device needs to communicate with another electronic device (e.g., to transmit a text message or to make a call), they may make a communication with each other in response to an event that occurred according to a user's input or a network event that occurred in an application installed on the electronic devices. Some of the applications, with a malicious intent, such as Short Message Service (SMS) phishing (SMiShing), may be installed on electronic devices without the user being aware of the installation. Such applications with the malicious intent are referred to as malware and illegal software. Malicious applications installed on an electronic device may transmit messages or make a call to other electronic devices without the electronic device user's knowledge. That is, the malicious applications installed on an electronic device may disclose the user's personal/private information without his or her knowledge.

However, electronic devices of the related art haven't been equipped with systems for preventing transmission of messages or connection of a call without the user's knowledge by the malicious applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for detecting and blocking an attempt to transmit messages or make a call without a user's confirmation or knowledge. The present disclosure further provides an electronic device adapted to the method.

In accordance with an aspect of the present disclosure, a method for detecting a request for transmission/reception of a message and a request for a call is provided. The method includes recognizing a request from one of the request for transmission of the message or the request for the call, determining whether the recognized request is created by a user's input, outputting an alert pop-up window when the recognized request is not created by the user's input, and determining whether to one of transmit the message or make the call, in response to another input of the user applied to the alert pop-up window.

In accordance with another aspect of the present disclosure, a method for detecting a request for transmission/reception of a message and a request for a call is provided. The method includes receiving a message from a Short Message Service Center (SMSC) and displaying contents of the message on a display screen, determining whether to trace an originator that transmitted the message, transmitting tracing information to the SMSC to trace an originator, and receiving source information about the originator, identified based on the tracing information, from the SMSC.

In accordance with another aspect of the present disclosure, an electronic device is provided. The electronic device includes a communication module configured to transmit a message and making a call, a display module, a user input module configured to detect a user's inputs, and a processor configured to recognize a request from one of a request for transmission of the message or the request for the call, to determine whether the recognized request is created by the user's input, to output an alert pop-up window when the recognized request is not created by the user's input, and to determine whether to one of transmit the message or make the call, in response to another input of the user applied to the alert pop-up window.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a flow chart that describes a method for detecting an originator of a message according to an embodiment of the present disclosure.

Throughout the drawings, it should be noted that like reference numbers are used to depict the same or similar elements, features, and structures.

DETAILED DESCRIPTION

Figure 1:
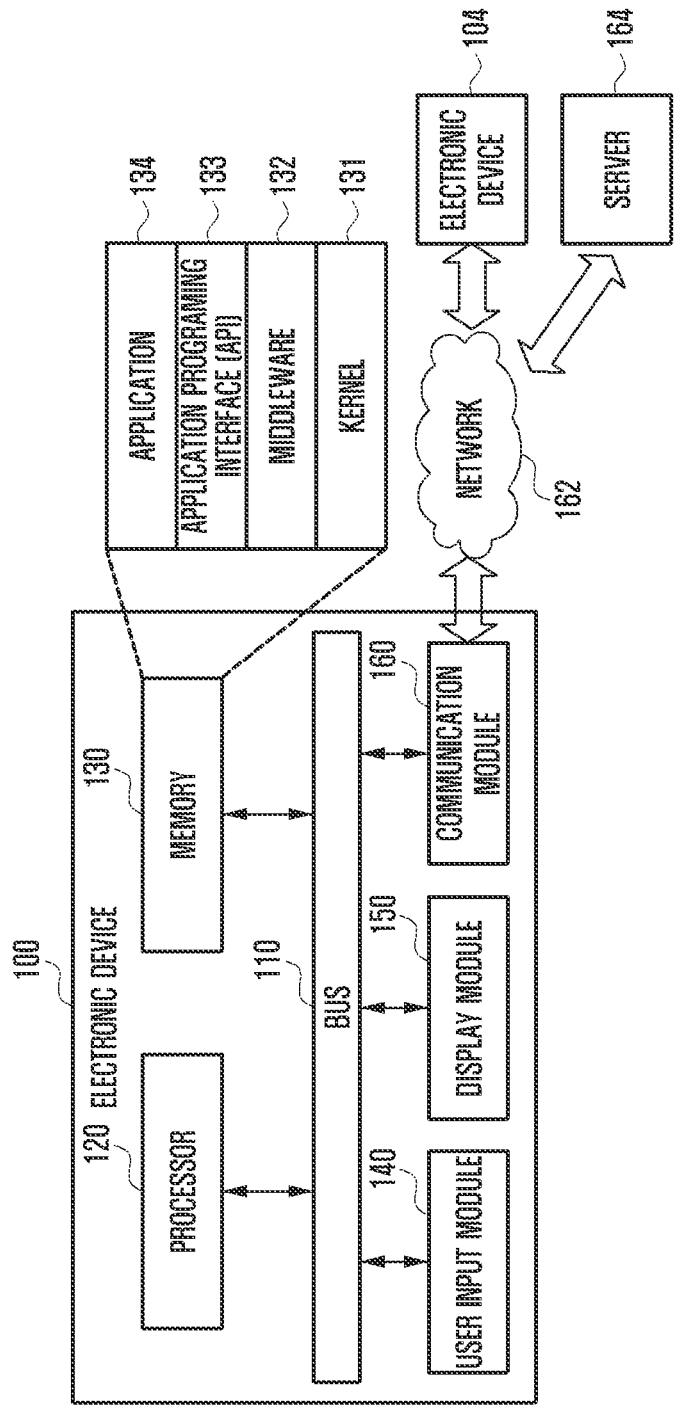
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, the electronic device may include devices having an operation support function. Examples of the electronic device may include a smartphone, a table Personal Computer (PC), mobile phone, a video phone, an electronic book (e-book) reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer III (MP3) player, a mobile medical appliance, a camera, a wearable device (e.g. head-mounted device (HMD) such as electronic glasses, electronic clothing, an electronic bracelet, an electronic necklace, an electronic appcessory, an electronic tattoo, a smartwatch, and the like.

According to an embodiment, the electronic device may be one of smart home appliances having operation support function. Examples of the smart electronic appliance as an electronic device may include a television, a Digital Versatile Disc (DVD) player, an audio player, a refrigerator, an air-conditioner, a vacuum cleaner, an electronic oven, a microwave oven, a laundry machine, an air cleaner, a set-to box, a TV box (e.g. Samsung HomeSync™, Apple TV™, and Google TV™), a game console, an electronic dictionary, an electronic key, a camcorder, and an electronic frame, and the like.

According to an embodiment, examples of the electronic device may include a medical device (e.g. Magnetic Resonance Angiography (MRA), Magnetic Resonance Imaging (MRI), Computed Tomography (CT)), a Navigation device, a Global Positioning System (GPS) receiver, an Event Data Recorder (EDR), a Flight Data Recorder (FDR), a car infotainment device, a maritime electronic device (e.g. a maritime navigation device and a gyro compass), an aviation electronic device (avionics), a security device, a vehicle head unit, an industrial or home robot, an Automatic Teller's Machine (ATM) of financial institution, a Point Of Sales (POS), and the like.

According to an embodiment, examples of the electronic device may include furniture and building/structure having a communication function, an electronic board, an electronic signature receiving device, a projector, and a metering device (e.g. water, electric, gas, and electric wave metering devices). According to various embodiments, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments may denote a person or a device (e.g. artificial intelligent electronic device) using the electronic device.

The term "module" according to the various embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

In the present disclosure, the expression 'message transmission' refers to an operation to transmit a message from one electronic device to another electronic device or vice versa, i.e., between one electronic device and another electronic device.

The expression 'to make a call' refers to an operation where one electronic device makes a call to another electronic device or vice versa.

FIG. 1 is a block diagram illustrating an electronic device according to various embodiments of the present disclosure.

Referring to FIG. 1, an electronic device 100 may include a bus 110, a processor 120, a memory 130, a user input module 140, a display module 150, a communication module 160, or a sensor module 170, but is not limited thereto.

The bus 110 may be a circuit connecting the aforementioned constituent elements to each other and transmitting communication (e.g., a control message) between the aforementioned constituent elements.

For example, the processor 120 may receive instructions from aforementioned other constituent elements (e.g., the memory 130, the user input module 140, the display module 150, and the communication module 160) through the bus 110, decipher the received instruction, and perform calculation or data processing according to the deciphered instruction.

The memory 130 may store an instruction or data received from the processor 120 or other constituent elements (e.g., the user input module 140, the display module 150, and the communication module 160) or generated by the processor 120 or other constituent elements. The memory 130 may include programming modules, for example, a kernel 131, a middleware 132, an Application Programming Interface (API) 133, or an application 134. The aforementioned respective programming modules may be formed of software, firmware, or hardware, or a combination of at least two of software, firmware, and hardware.

The kernel 131 may control or manage system resources (e.g., the bus 110, the processor 120, or the memory 130) used for executing an operation or a function implemented in the remaining programming modules, for example, the middleware 132, the API 133, or the application 134. Further, the kernel 131 may provide an interface through which the middleware 132, the API 133, or the application 134 may access and control or manage an individual constituent element of the electronic device 100.

The middleware 132 may serve as an intermediary so that the API 133 or the application 134 may transceive data while communicating with the kernel 131. Further, in relation to work requests received from the plurality of applications 134, the middleware 132 may perform load balancing on the work requests by using, for example, a method of assigning a priority for using the system resource (e.g., the bus 110, the processor 120, or the memory 130) of the electronic device 100 to at least one application among the plurality of applications 134.

The API 133 is an interface, through which the application 134 may control a function provided from the kernel 131 or the middleware 132, and may include at least one interface or function, for example, file control, window control, image processing, or character control.

The user input module 140 may, for example, receive an instruction or data from a user and transmit the received instruction or data to the processor 120 or the memory 130 through the bus 110. The display module 150 may display an image, a video, or data to a user.

The communication module 160 may connect communication between another electronic device 104 and the electronic device 100. The communication module 160 may support a predetermined near field communication protocol (e.g., Wireless Fidelity (WiFi), Bluetooth (BT), Near Field Communication (NFC)) or predetermined network communication 162 (e.g., Internet, a Local Area Network (LAN), a Wide Area Network (WAN), a telecommunication network, a cellular network, a satellite network, or a Plain Old Telephone Service (POTS)). Each of the electronic devices 104 and 164 may be the same as (e.g., the same type) or different (e.g., a different type) from the electronic device 100.

Figure 2:
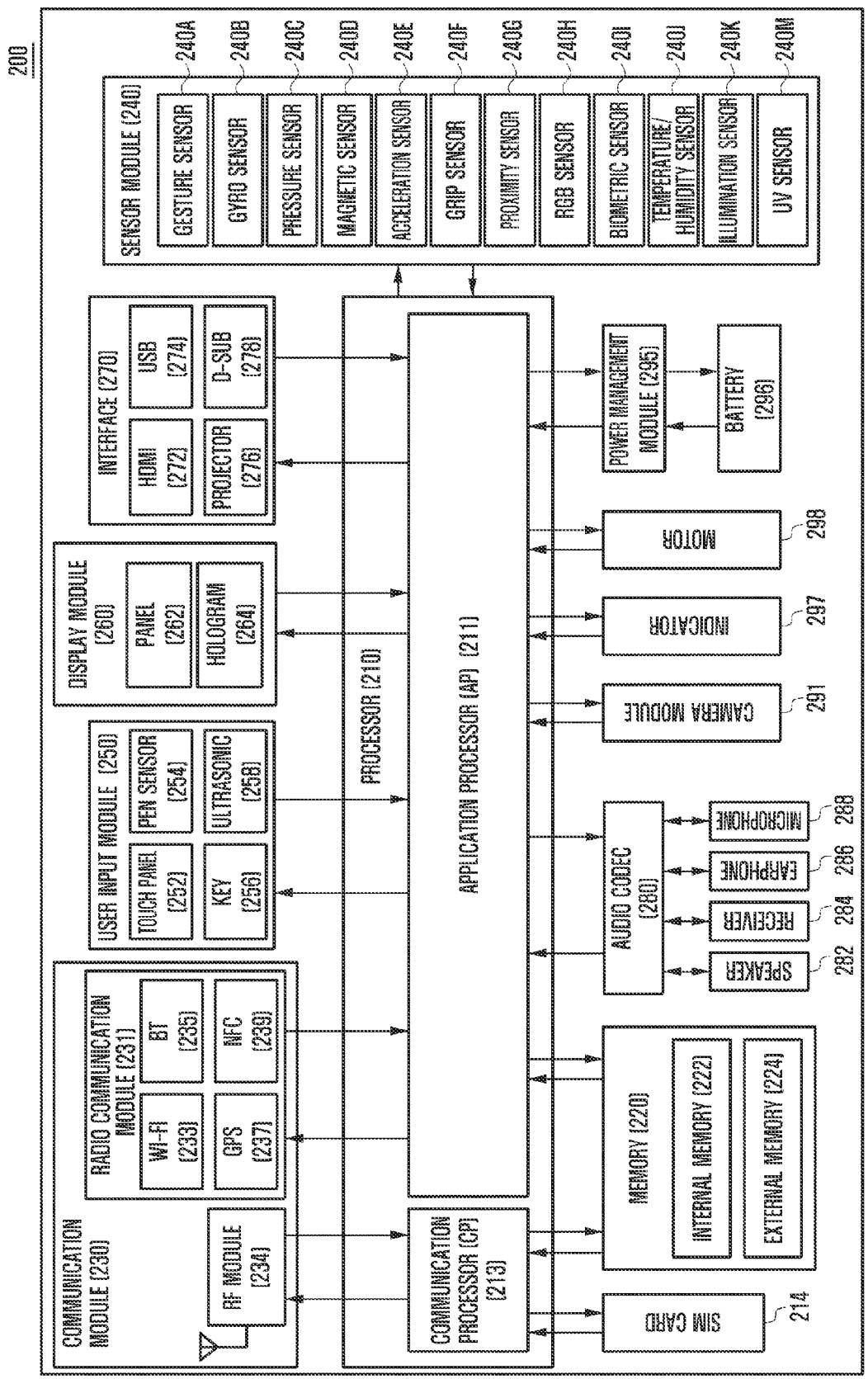
FIG. 2 is a block diagram of hardware according to an embodiment of the present disclosure.

FIG. 2 is a block diagram illustrating the hardware according to various embodiments of the present disclosure.

Referring to FIG. 2, an electronic device 200 may be, for example, the electronic device 100 illustrated in FIG. 1. The electronic device 200 may include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298, but is not limited thereto.

The processor 210 (e.g., the processor 120) may include one or more Application Processors (AP) 211, one or more Communication Processors (CP) 213. The processor 210 may be, for example, the processor 120 illustrated in FIG. 1. It is illustrated in FIG. 2 that the AP 211 and the CP 213 are included in the processor 210, but the AP 211 and the CP 213 may be included in different IC packages, respectively. In an embodiment, the AP 211 and the CP 213 may be included in one IC package.

The AP 211 may control a plurality of hardware or software elements connected to the AP 211 by driving an operating system or an application program, and perform processing and calculation on various data including multimedia data. The AP 211 may be implemented as, for example, a System on Chip (SoC). According to an embodiment, the processor 210 may further include a Graphic Processing Unit (GPU) (not shown).

The CP 213 may perform a function of managing a data link in communication between the electronic device (e.g., the electronic device 100) including the electronic device 200 and another electronic device connected through the network and converting a communication protocol. The CP 213 may be implemented, for example, as an SoC. According to an embodiment, the CP 213 may perform at least a part of a multimedia control function. The CP 213 may perform discrimination and authentication of a terminal within a communication network by using, for example, a subscriber identification module (e.g., the SIM card 214). Further, the CP 213 may provide the user with services, such as voice call, video call, a text message, or packet data.

Further, the CP 213 may control data transception of the communication module 230. It is illustrated in FIG. 2 that the constituent elements, such as the CP 213, the power management module 295, or the memory 220 are separate from the AP 211, but according to one an embodiment, the AP 211 may be implemented so as to include at least a part (e.g., the CP 213) of the aforementioned constituent elements.

According to an embodiment, the AP 211 or the CP 213 may load an instruction or data received from a nonvolatile memory connected to the AP 211 or the CP 213 or at least one of other constituent elements in a volatile memory and process the instruction or the data. Further, the AP 211 or the CP 213 may store data received from at least one of other constituent elements or generated by at least one of other constituent elements in the nonvolatile memory.

The SIM card 214 may be a card implementing a subscriber identification module, and may be inserted into a slot formed at a specific position of the electronic device 100. The SIM card 214 may include unique identification information (e.g., an Integrated Circuit Card Identifier (ICCID) or International Mobile Subscriber Identity (IMSI)).

The memory 220 may include an internal memory 222 or an external memory 224. The memory 220 may be, for example, the memory 130 illustrated in FIG. 1. The internal memory 222 may include at least one among, for example, a volatile memory (e.g., a Dynamic Random Access Memory (DRAM), a Static RAM (SRAM), and a Synchronous DRAM (SDRAM)) and a nonvolatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory). According to an embodiment, the internal memory 222 may also have a type of a Solid State Drive (SSD). The external memory 224 may further include a flash drive, for example, Compact Flash (CF), Secure Digital (SD), Micro-Secure Digital (Micro-SD), Mini-Secure Digital (mini-SD), extreme Digital (xD), or a memory stick.

The communication module 230 may include a wireless communication module 231 or an RF module 234. The communication module 230 may be, for example, the communication module 160 illustrated in FIG. 1. The wireless communication module 231 may include, for example, a WiFi 233, a BT 235, a GPS 237, or a NFC 239. For example, the wireless communication module 231 may provide a wireless communication function by using a wireless frequency. In addition or in general, the wireless communication module 231 may include a network interface (e.g., a LAN card) or a modem for connecting the electronic device 200 with a network (e.g., the Internet, the LAN, the Wide Area Network (WAN), the telecommunication network, the cellular network, the satellite network, or the Plain Old Telephone Service (POTS).

The RF module 234 may serve to transceive data, for example, an RF signal or a called electronic signal. Although the RF module 234 is not illustrated, the RF module 234 may include, for example, a transceiver, a Power Amp Module (PAM), a frequency filter, or a Low Noise Amplifier (LNA).

Further, the RF module 234 may further include a component, such as a conductor or a conductive line, for transceiving electromagnetic waves in a free space in wireless communication.

The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, Blue (RGB) sensor 240H, a biometric sensor 240I, a temperature/humidity sensor 240J, an illuminance sensor 240K, and an Ultra Violet (UV) sensor 240M. The sensor module 240 may measure a physical quantity or detect an operation state of the electronic device, and convert the measured or detected information into an electrical signal. In addition/general, the sensor module 240 may include, for example, an E-nose sensor (not shown), an ElectroMyoGraphy (EMG) sensor (not shown), an ElectroEncephaloGram (EEG) sensor (not shown), an ElectroCardioGram (ECG) sensor (not shown), or a fingerprint sensor. The sensor module 240 may further include a control circuit for controlling one or more sensors included therein.

The user input module 250 may include a touch panel 252, a (digital) pen sensor 254, a key 256, or an ultrasonic wave input device 258. The user input module 250 may be, for example, the user input module 140 illustrated in FIG. 1. The touch panel 252 may recognize a touch input by at least one method of, for example, a capacitive method, a resistive method, an infrared ray method, and an ultrasonic wave method. Further, the touch panel 252 may further include a controller (not shown). In a case of the capacitive method, the touch panel 252 may recognize a proximity touch, as well as a direct touch. The touch panel 252 may further include a tactile layer. In this case, the touch panel 252 may provide the user with a tactile response.

The (digital) pen sensor 254 may be implemented by a method identical or similar to the reception of a touch input of the user or by using a separate sheet for recognition. The key 256 may adopt, for example, a keypad or a touch key. The ultrasonic wave input device 258 is a device capable of detecting sound waves through a microphone (e.g., the microphone 288) in a terminal through a pen generating an ultrasonic wave signal and identifying data, and may perform wireless recognition. According to an embodiment, the electronic device 200 may receive a user input from an external device (e.g., a network, a computer, or a server) connected with the communication module 230 through the communication module 230.

The display module 260 may include a panel 262 or a hologram 264. The display module 260 may be, for example, the display module 150 illustrated in FIG. 1. The panel 262 may be, for example, a Liquid Crystal Display (LCD) or an Active Matrix Organic Light Emitting Diode (AM-OLED). The panel 262 may be, for example, flexibly, transparently, or wearably implemented. The panel 262 may be formed in one module with the touch panel 252. The hologram 264 may show a 3D image in the air by using interference of light. According to an embodiment, the display module 260 may further include a control circuit for controlling the panel 262 or the hologram 264.

The interface 270 may include, for example, a High Definition Multimedia Interface (HDMI) 272, a Universal Serial Bus (USB) 274, a projector 276, or a D-subminiature (D-sub) 278. In addition or in general, the interface 270 may include, for example, Secure Digital (SD)/Multi-Media Card (MMC) (not shown) or Infrared Data Association (IrDA) (not shown).

The audio codec 280 may bilaterally convert a voice and an electrical signal. The audio codec 280 may convert voice information input or output through, for example, a speaker 282, a receiver 284, an earphone 286, or a microphone 288.

The camera module 291 is a device capable of photographing an image and a video, and according to an embodiment, may include one or more image sensors (e.g., a front lens or a rear lens), an Image Signal Processor (ISP) (not shown), or a flash LED (not shown).

The power management module 295 may manage power of the electronic device 200. Although it is not illustrated, the power management module 295 may include, for example, a Power Management Integrated Circuit (PMIC), a charger Integrated Circuit (IC), or a battery fuel gauge.

The PMIC may be mounted within, for example, an integrated circuit or an SoC semiconductor. A charging manner may be divided into a wired manner or a wireless manner. The charger IC may charge the battery, and prevent an inflow of overvoltage or overcurrent from a charger. According to an embodiment, the charger IC may include a charger IC for at least one of a wired charging manner or a wireless charging manner. The wireless charging manner may include, for example, a magnetic resonance manner, a magnetic induction manner, or an electromagnetic wave manner, and may additionally include an additional circuit for wireless charging, for example, a coil loop, a resonant circuit, and a rectifier.

The battery fuel gauge may measure, for example, a residual quantity, a voltage during charging, a current, or a temperature of the battery 296. The battery 296 may generate electricity and supply a power source, and may be, for example, a rechargeable battery.

The indicator 297 may display a specific state, for example, a booting state, a message state, or a charging state, of the electronic device 200 or a part of the electronic device 200 (e.g., the AP 211). The motor 298 may convert an electrical signal into a mechanical vibration.

Although it is not illustrated, the electronic device 200 may include a processing device (e.g., the GPU) for supporting a mobile TV. The processing device for supporting the mobile TV may process media data according to a standard of, for example, Digital Multimedia Broadcasting (DMB), Digital Video Broadcasting (DVB), or multimedia flow. In the embodiment according to the present disclosure, each of the aforementioned constituent elements of the hardware may be formed of one or more components, and a name of a corresponding constituent element may be changed according to the kind of electronic device. In the embodiment according to the present disclosure, the hardware may be formed of at least one among the aforementioned constituent elements, and some constituent elements may be omitted or other additional constituent elements may be included in the hardware. Further, in the embodiment according to the present disclosure, some of the constituent elements of the hardware are combined to form one entity, so that the functions of the corresponding constituent elements before the combination may be equally performed.

Figure 3:
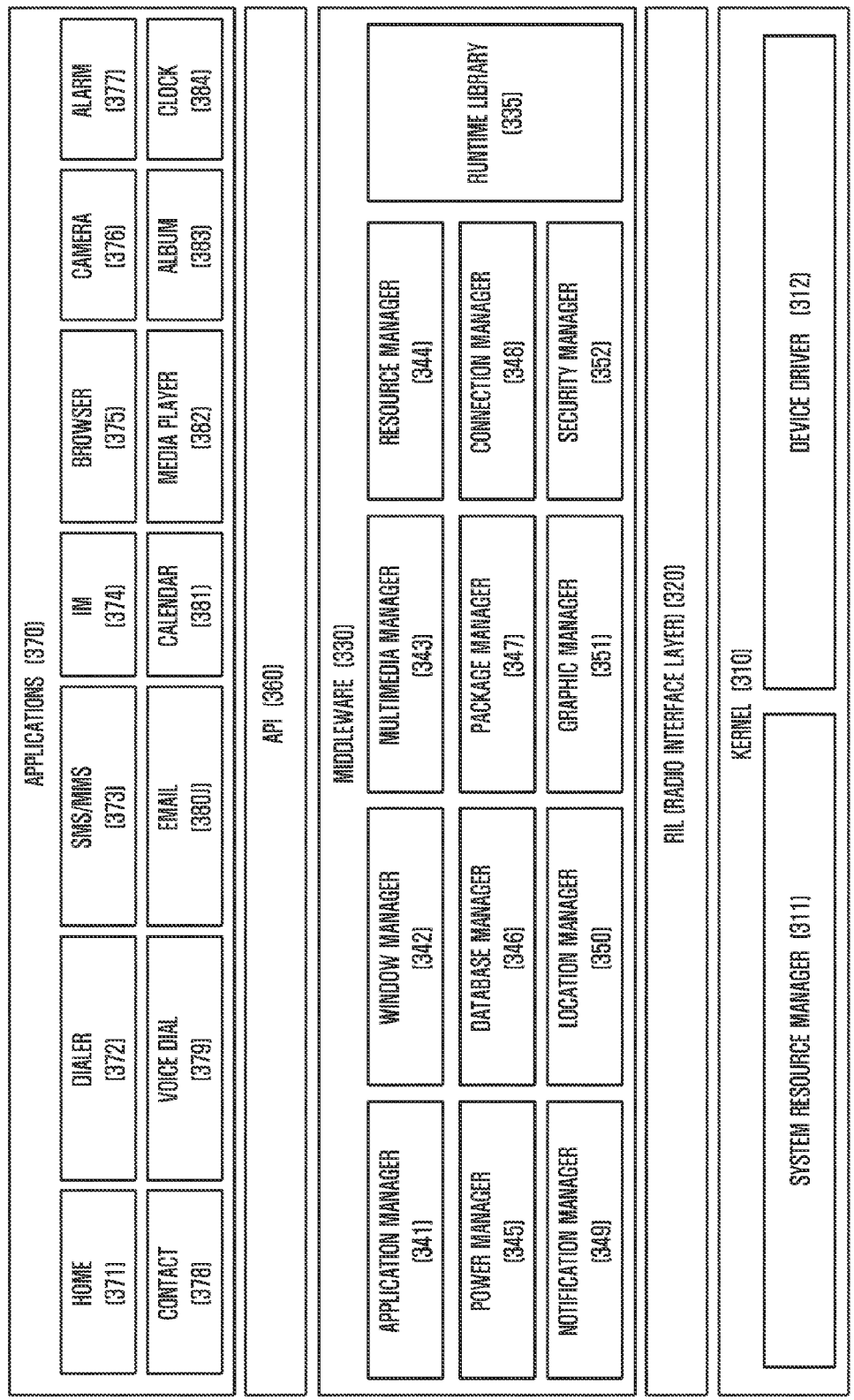
FIG. 3 is a block diagram of a programming module according to an embodiment of the present disclosure.

FIG. 3 is a block diagram illustrating a programming module 300 according to an embodiment of the present disclosure.

Referring to FIG. 3, a programming module 300 may be included (e.g., stored) in the electronic device 100 (e.g., the memory 130) illustrated in FIG. 1. At least a part of the programming module 300 may be formed of software, firmware, or hardware, or a combination of two or more of software, firmware, and hardware. The programming module 300 may include an Operating System (OS) implemented in the hardware (e.g., the electronic device 200) to control a resource related to the electronic device (e.g., the electronic device 100) or various applications (e.g., an application 370) driven on the operating system. For example, the OS may be Android, iOS, Windows, Symbian, Tizen, or Bada. Referring to FIG. 3, the programming module 300 may include a kernel 310, middleware 330, an API 360, or the application 370.

The kernel 310 (e.g., the kernel 131) may include a system resource manager 311 or a device driver 312. The system resource manager 311 may include, for example, a process manager, a memory manager, or a file system manager. The system resource manager 311 may perform control, allocation, or collection of a system resource. The device driver 312 may include, for example, a display driver, a camera driver, a Bluetooth driver, a shared memory driver, a USB driver, a keypad driver, a WiFi driver, or an audio driver. Further, according to an embodiment, the device driver 312 may include an Inter-Process communication (IPC) driver (not shown).

Hereinafter, various embodiments of the present disclosure are described in detail with reference to the accompanying drawings. The same reference numbers are used throughout the drawings to refer to the same or similar parts. Detailed descriptions of well-known functions and structures incorporated herein may be omitted to avoid obscuring the subject matter of the disclosure.

The Radio Interface Layer (RIL) 320 serves to communicate with wireless communication devices based on a variety of technologies such as Code Division Multiple Access (CDMA)/Global System for Mobile Communications (GSM). In order to understand the functions of the RIL 320, it is necessary to first understand Windows-based mobile devices. Windows-based mobile devices make a call, send SMS messages, and perform data communication by using the dialer software that Microsoft provides as a default interface. In addition, Windows-based mobile devices may perform the tasks that the dialer software has processed by software that users or service providers created. That is, users or service providers may develop application software that sends SMS messages, makes a call, and performs other tasks by using API 360. In application software developed by users, a part processing wireless communication-related API, called a RIL proxy, and a part processing data by communicating with real wireless communication devices, called a RIL driver, are commonly called RIL 320. The RIL 320 may communicate with a communication module through serial communication, USB communication, and the like. The RIL 320 may control a voice call and data communication and may also perform transmission/reception of SMS messages.

The middleware 330 may include a plurality of modules pre-implemented in order to provide a function commonly required by the application 370. Further, the middleware 330 may provide a function through the API 360 so as for the application 370 to efficiently use a limited system resource inside the electronic device. For example, as illustrated in FIG. 3, the middleware 330 (e.g., the middleware 132) may include at least one of a run time library 335, an application manager 341, a window manger 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module used by a compiler in order to add a new function through a programming language during the execution of the application 370. According to an embodiment, the run time library 335 may perform a function for input/output, memory management, or a calculation function.

The application manager 341 may manage, for example, a life cycle of at least one application in the application 370. The window manager 342 may manage a GUI resource used in a screen. The multimedia manager 343 may recognize a format necessary for reproducing various media files, and perform encoding or decoding of a media file by using a codec appropriate to a corresponding format. The resource manager 344 may manage a resource, such as a source code, a memory, or a storage space, of at least one application in the application 370.

The power manager 345 may be operated together with a Basic Input/Output System (BIOS) and the like to manage a battery or a power, and provide power information necessary for the operation. The database manager 346 may manage the database so as to generate, search, or change a database to be used in at least one application in the application 370. The package manager 347 may manage installation or update of an application distributed in a form of a package file.

The connectivity manager 348 may manage wireless connection, such as WiFi or Bluetooth. The notification manager 349 may display or notify an event, such as an arrival message, an appointment, or proximity notification, to the user in a non-disturbed manner. The location manager 350 may manage location information about the electronic device. The graphic manager 351 may manage a graphic effect to be provided to the user or a user interface related to the graphic effect. The security manager 352 may provide a general security function necessary for system security or user authentication. According to an embodiment, in a case where the electronic device (e.g., the electronic device 100) includes a call function, the middleware 330 may further include a telephony manager (not shown) for managing a voice or video call function of the electronic device.

The middleware 330 may generate a new middleware module through a combination of various functions of the aforementioned internal constituent element modules and use the generated new middleware module. The middleware 330 may provide a module specialized for each type of the OS in order to provide a differentiated function. Further, some of existing constituent elements may be dynamically deleted or new constituent elements may be added to the middleware 330. Accordingly, some of the constituent elements described in the embodiment of the present disclosure may be omitted, other constituent elements may be further included, or the constituent element may be substituted with a constituent element performing a similar function but having a different name.

The API 360 (e.g., the API 133) is a set of API programming functions, and may be provided with different configurations according to the OS. For example, in a case of the Android or iOS, one API set may be provided for each platform, and in a case of the Tizen, two or more API sets may be provided.

The application 370 may include at least one of a home 371, a dialer 372, a Short Messaging Service (SMS)/Multimedia Messaging Service (MMS) 373, an Instant Messenger (IM) 374, a browser 375, a camera 376, an alarm 377, a contact 378, a voice dial 379, an e-mail 380, a calendar 381, a media player, 382, an album 383, and a clock 384.

The application 370 (e.g., the application 134) may include, for example, a preloaded application or a third party application. Application according to an embodiment of the present disclosure may include an illegal application. The illegal application refers to application software that may transmit messages or make a call without an electronic device user's determination. That is, the illegal application installed to an electronic device may transmit malicious messages such as spam messages to other electronic devices without the electronic device user's confirmation or knowledge. For example, an illegal application installed to an electronic device may transmit malicious messages to the electronic devices of the phone numbers stored in the phonebook of the electronic device regardless of the electronic device user's intent.

Figure 4:
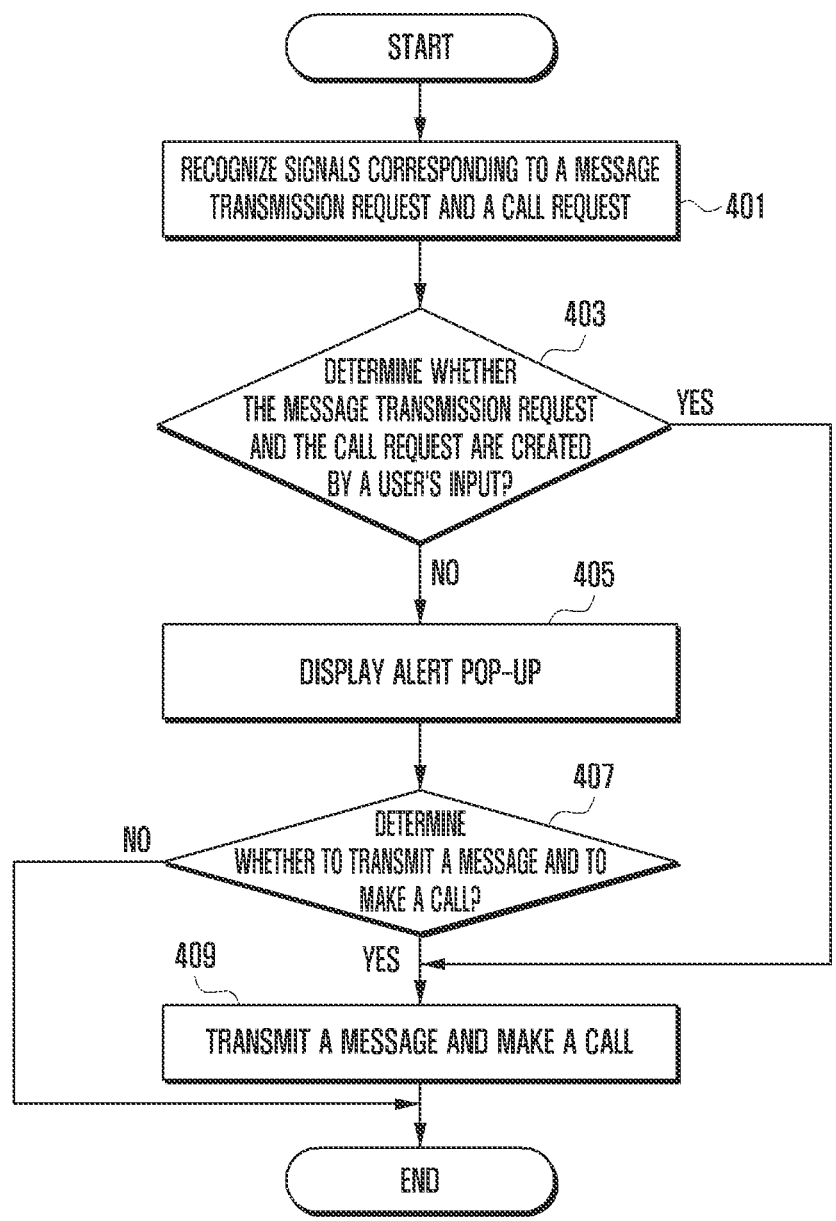
FIG. 4 is a flowchart that describes a method for preventing an attempt to transmit messages or make a call without a user's confirmation or knowledge according to an embodiment of the present disclosure.

FIG. 4 is a flowchart that describes a method for preventing an attempt to transmit messages or make a call without a user's confirmation or knowledge according to an embodiment of the present disclosure.

Referring to FIG. 4, a processor 210 of an electronic device 200 may recognize signals corresponding to a message transmission request and a call request in operation 401. The electronic device 200 may be the electronic device 100 shown in FIG. 1. The processor 210 may be the processor 120 shown in FIG. 1. The processor 210 may recognize a request for transmit a message (a message transmission request) and a request for a call (a call request). For example, the requests may be created by a user's input or an application installed to the electronic device 200. The processor 210 may determine whether the message transmission request and the call request are created by a user's input in operation 403.

For example, when a user performs a transmission of a message, the processor 210 of the electronic device 200 receives the user's input through a user input module 250 (e.g., a key 256) and operates the display module 260. When a message transmission request and a call request are created while the display module 260 is disenabled, they may not be requests by a user's input. The processor 210 may detect a user's input through the user input module 250 as an event. Examples of the user input module 250 are a touch panel 252, a pen sensor 254, a key 256, an ultrasonic input system 258, and the like. In the embodiment of the present disclosure, user's inputs may be created by one or more of: the touch panel 252, the pen sensor 254, the key 256, and the ultrasonic input system 258. When a user performs a transmission of a message by his/her input, he/she grips and holds up the electronic device 200 and applies his/her inputs for a message to the user input module, watching the display screen. The processor 210 detects movements of the electronic device 200, such as a user's grip or holing up, and the like, by using the sensor module 240 (e.g., grip sensor 240F, gyro sensor 240B, and acceleration sensor 240E), and recognizes them as events respectively. For example, the processor 210 detects a user's grip of the electronic device 200 by the grip sensor 240F and recognizes the grip as an event. The processor 210 detects a movement of the electronic device 200 by the gyro sensor 240B and recognizes the movement as an event. When the processor 210 detects a preset event by the user input module 250 and the sensor module 240, the processor 210 may recognize the user's input of the event as a request to transmit a message. The processor 210 activates an application relate to message according to a user's input and allows the user to write a message by applying his/her inputs. After the user has written a message on the electronic device 200, the processor 210 may transmit the message to the other electronic device by the communication module 230. When the processor 210 detects a signal corresponding to the message transmission request when the event occurs, the processor 210 concludes that the signal is created according to a user's input. When the processor 210 ascertains that the message transmission request is created by a user's input at operation 403, the processor 210 may transmit the message at operation 409.

In addition, when the processor 210 receives a call request, the processor 210 may determine whether the call request is created by a user's input. The determination is performed in the same process as the determination as to whether the received call request is created by a user's input, described above. The method and electronic device according to the present disclosure may determine whether the message transmission request and the call request are created by a user's inputs. Since the method and electronic device detects a message transmission request and a call request according to the presence of a user's input, they may prevent transmission of messages or connection of a call, as illegal messages or an illegal call, without a user's confirmation.

Meanwhile, although it is not shown, when the processor 210 ascertains that the message transmission request and the call request are created not by a user's inputs but by a user's confirmed application, at operation 403, the processor 210 may conclude that they are created by a user's inputs. The user's confirmed application may be an application for transmitting messages and making a call, preset by the user. That is, when the processor 210 ascertains that a user's confirmed application requests to transmit a message and to make a call, the processor 210 concludes that the requests are created by a user's inputs. Therefore, the processor 210 transmits a message and makes a call.

On the contrary, when the processor 210 ascertains that the message transmission request and the call request are not created by a user's input at operation 403, the processor 210 may output an alert pop-up (alert pop-up window) in operation 405, so that the user may determine whether he/she transmits a message and makes a call. The processor 210 may output an alert pop-up and inform the user that requests have been created regardless of his/her intent. The alert pop-up may include an input window to determine whether to accept a message transmission and a call connection. The processor 210 may determine whether to perform a message transmission and a call connection in response to a user's input applied to the alert pop-up. The processor 210 may display a visual alert pop-up on the panel 262 of the display module 260 and also output a voice corresponding to the alert information by using the audio codec 280. That is, it should be understood that the manner to inform a user that requests have been created regardless of a user's intent is not limited to the alert pop-up. The processor 210 determines whether to accept a message transmission and a call connection according to a user's inputs applied to the alert pop-up in operation 407. For example, the processor 210 may detect a user's inputs applied to the alert pop-up. The processor 210 may determine whether to accept a message transmission and a call connection in response to the user's detected inputs. Although the embodiment was described in such a way that operation 407 is performed by a user's input applied to a touch panel 252, it should be understood that the embodiment is not limited to the user's input applied to the touch panel 252. For example, the processor 210 may determine whether to transmit a message and to make a call according to the presence of a preset event. When the processor 210 accepts a message transmission and a call connection at operation 407, the processor 210 may transmit a message and make a call in operation 409. On the contrary, when the processor 210 doesn't accept a message transmission and a call connection at operation 407, the processor 210 terminates the procedure.

Figure 5:
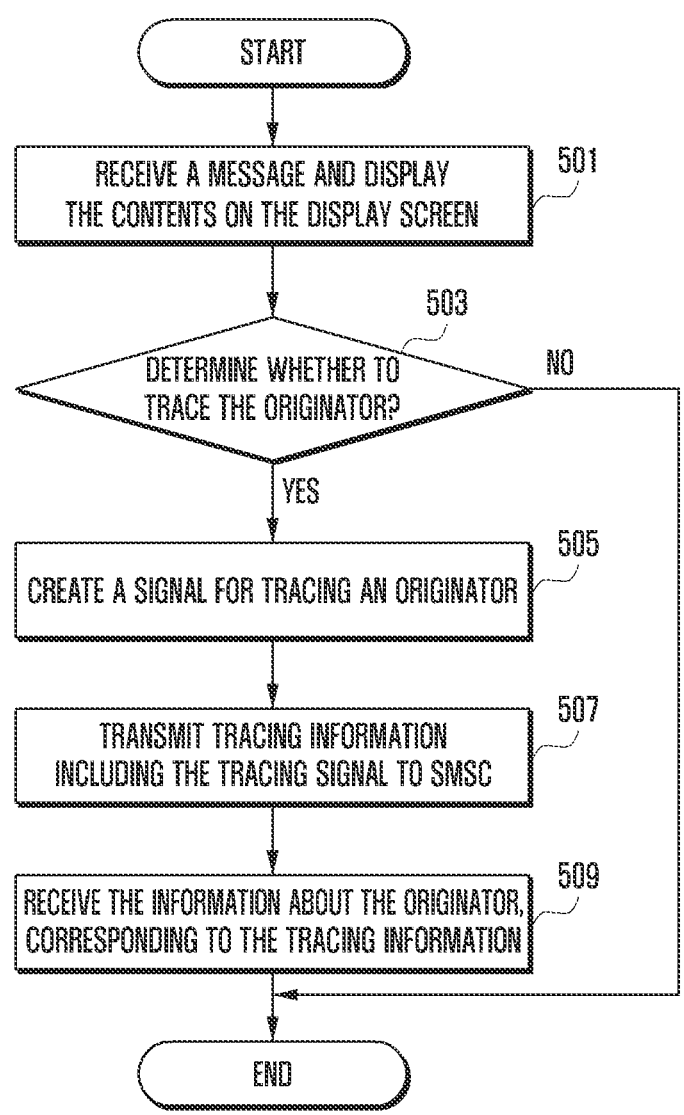
FIG. 5 is a flow chart that describes a method for detecting, when receiving a message, an originator of the message according to an embodiment of the present disclosure.

FIG. 5 is a flow chart that describes a method for detecting, when receiving a message, an originator of the message according to an embodiment of the present disclosure.

Referring to FIG. 5, the processor 210 (e.g., the processor 120) of the electronic device 200 may receive a message from an originator through the communication module 230 in operation 501. Examples of the originator are web servers, mobile communication devices, subscribed mobile communication services such as 3G, 4G, wired telephones, and the like. The processor 210 may also display the contents of the received message on the panel 262 of the display module 260 in operation 501. In particular, the message may be transmitted from the originator to the electronic device 200 via a network. An example of the network is a Short Message Service Center (SMSC). The originator may be an electronic device (e.g., the electronic device 104 shown in FIG. 1) that transmits a message; however it should be understood that it is not limited to the electronic device 104. The message transmitted from the originator may include the phone number of the originator, the contents, and the unique device identification (UDI) of the originator (e.g., the electronic device 104). Since the phone number of an originator may be altered by the originator, the phone number cannot be used for an element to identify an originator. Since the UDI of an originator, for example, the electronic device 104, is a unique identification number created in the electronic device 104 that transmits a message, the UDI may be used for an element to identify an originator that transmits a message. For example, if the electronic device 104 is an originator and transmits a message, the message includes the UDI. The SMSC may trace the electronic device 104 that transmitted a message, based on the UDI of the electronic device 104 included in the message.

For example, if a message that the electronic device 200 has received from a server (e.g., the server 164 shown in FIG. 1), the message doesn't include a UDI of the electronic device 104 as an originator. That is, if a message that the electronic device 200 has received doesn't include a UDI of the electronic device 104 as an originator, the message may not be a message transmitted from the electronic device 104. In that case, the message that the electronic device 200 has received may be a message transmitted through web pages. After displaying the contents of the received message on the display screen at operation 501, the processor 210 of the electronic device 200 determines whether to trace the originator of the message at operation 503. Although it is not shown, the processor 210 may receive a user's input via the user input module 250 and determine whether to trace an originator of a message in response to the user's input. For example, the processor 210 may output a notification window via the display module 260, and receive a user's input applied to the touch panel 252 via the user input module 250. The processor 210 may determine whether to trace an originator of a message based on the user's input. When the processor 210 determined not to trace an originator of a message at operation 503, the message that the electronic device 200 has received may be a normal message. The normal message may be a message corresponding to a case where the user ascertains that the message is transmitted from a phone number of an originator and the contents is proper. For example, if a phone number of an originator of a message is a user's friend's phone number and the contents include an inquiry after a user's health, the received message may be a normal message. If a phone number of an originator of a message is an insurance company's phone number and the contents include details related to insurance, the received message may be a normal message. The normal message refers to a message that allows the processor 210 to identify the originator by using the phone number of the originator and the contents of the message, without tracing the transmitting source of the message. When the processor 210 determined to trace an originator of a message, based on a user's input, through the user input module 250 at operation 503, the processor 210 may create a signal for tracing an originator at operation 505. The processor 210 may transmit tracing information including the created tracing signal to the SMSC (e.g., the network 162 shown in FIG. 1) via the communication module 230 at operation 507. The tracing information may include the phone number of the originator included in the received message, the contents of the message, the DUI of the originator, and the timestamps of the message when the message is transmitted and received, and a signal for tracing the originator created in the electronic device 200. The SMSC may be a system that connects the electronic device 104 and the other electronic device 104 so that they may perform transmission/reception of data (e.g., messages) therebetween. The SMSC is a system for transmitting messages to wireless electronic devices with a communication function, and is used as a default system that most communication service providers provide to mobile phone subscriber. The SMSC manages transmission/reception of data and store information related to messages. For example, the SMSC may store message-related information: such as a phone number of an electronic device that transmitted a message, the contents of the message, the UDI of an originator, timestamps of the message when the message is transmitted and received, and the like. The SMSC may trace and identify an originator of a message based on the stored information. At operation 507, the tracing information may include a phone number of an originator that transmitted a message, the contents of the message, the UDI of the originator, and the timestamps of the message when the message is transmitted and received, and a signal for tracing the originator. That is, when the message includes a phone number of the originator, the SMSC may determine whether the phone number is a fake phone number based on the tracing information. The processor 210 may transmit the tracing information to the SMSC through the communication module 230 at operation 507. Although it is not shown, the SMSC may trace and identify the originator of the message based on the received tracing information. For example, the SMSC may identify an originator based on the UDI of the originator and the timestamps of the message when the message is transmitted and received. When the tracing information includes a phone number of the originator, the SMSC may determine whether the phone number is a fake phone number. The SMSC may transmit information about the originator to the electronic device 200. The information about the originator may include information to determine whether the phone number of the originator is a fake phone number. The processor 210 may receive the information about the originator, corresponding to the tracing information, from the SMSC at operation 509. Although it is not shown, the processor 210 may output information related to the originator to the panel 262 of the display module 260, based on the received information about the originator. For example, if the phone number of an originator in the received message differs from that of an originator traced according to the tracing information, the processor 210 may output the real phone number of the originator. The processor 210 may take an action for a corresponding originator based on a user's input applied to the user input module 250. For example, the processor 210 may block a message and a call from a corresponding originator. That is, the processor 210 may originally block a request from the originator, based on the phone number of the originator that is traced.

In another embodiment of the present disclosure, the received message may include the contents and the UDI of an originator. That is, the message may not include the phone number of the originator. Although the tracing information doesn't include the phone number of an originator, the SMSC may trace the originator. The electronic device 200 receives information about the originator from the SMSC, and outputs the real phone number 262 of the originator to the panel 262.

FIG. 6 is a flow chart illustrating a method for detecting an originator of a message according to an embodiment of the present disclosure.

Referring to FIG. 6, an originator 610 transmits a message to a recipient 630 through a SMSC 620. The originator 610 and the recipient 630 refer to electronic devices or external electronic devices. In particular, the originator 610 refers to an electronic device that transmits messages, for example, the electronic device 104 shown in FIG. 1, and the recipient 630 refers to an electronic device that receives messages, for example, the electronic device 100. The originator 610 prepares to transmit a message to the recipient 630 at operation 601.

For the method for tracing and identifying an originator of a message according to an embodiment of the present disclosure, a message transmitted from the originator includes the phone number of the originator, the contents of the message, and the UDI of the originator. Since the originator 610 may set the originator's phone number to any number, the phone number may be a fake phone number. The originator 610 transmits a message including the phone number of the originator, the contents of the message, and the UDI of the originator to the SMSC 620 at operation 603. If the originator 610 is a web server, the message may not include the UDI. The SMSC 620 stores and manages the phone number of the originator, the contents of the message, and the UDI of the originator. The SMSC 620 may also store and manage a timestamp of the message when the message is received. The SMSC 620 may identify the originator 610, based on the phone number of the originator, the contents of the message, the UDI of the originator and the timestamp of the message. The SMSC 620 transmits a message including the phone number of the originator, the contents of the message, the UDI of the originator and the timestamp of the message to the recipient 630 at operation 605. The recipient 630 receives the message from the SMSC 620 and outputs the contents of the message through the panel 262 of the display module 260 at operation 607. The recipient 630 may output the phone number of the originator 610 along with the contents of the message. Although it is not shown, after recognizing the contents of the message displayed on the recipient 630, the user may determine whether to trace the originator 610. The recipient 630 receives a user's input through the user input module 250 at operation 609. The recipient 630 determines whether to trace the originator 610 according to a user's input at operation 609. When the recipient 630 receives a user's input of an option to trace the originator 610, the recipient 630 may create a signal for tracing an originator 610 (an originator tracing signal) at operation 609. The originator tracing signal, serving to identify an originator, is a message type according to an embodiment of the present disclosure. In order to trace the originator 610, the recipient 630 transmits the tracing information to the SMSC 620 at operation 611. The tracing information includes the phone number of the originator, the UDI of the originator, the timestamp of the message when the message is received, and the originator tracing signal (e.g., a message type). The SMSC 620 identifies the originator 610 based on the received tracing information at operation 613. More specifically, the SMSC 620 may identify the originator 610 based on the received tracing information, i.e., the UDI of the originator, the timestamp of the message when the message is received, and the originator tracing signal. For example, the SMSC 620 may identify whether the originator 610 is a terminal device by using the UDI of the originator. The SMSC 620 may identify whether the phone number of the originator is a fake phone number by using the timestamp. The SMSC 620 transmits source information about the identified originator to the recipient 630 at operation 615. The source information about the originator may include information about whether the phone number of the originator is a fake phone number. Although it is not shown, the recipient 630 may output the received source information about the originator to the panel 262 of the display module 260. The recipient 630 may take an action for the originator 610 based on a user's input applied to the user input module 250 at operation 617. For example, the recipient 630 may block a message and a call from the originator 610. That is, the processor may originally block a request from the originator, based on the real phone number of the originator that is traced.

In another embodiment of the present disclosure, for the method for identifying the originator 610, the message may include the contents and the UDI of the originator 610. That is, the message may not include the phone number of the originator 610. Although the tracing information doesn't include the phone number of the originator 610, the SMSC may trace the originator 610.

As described above, the method and the electronic device according to the present disclosure may detect a message transmission request and a call request, created without a user's confirmation, and may inform the user of the detection, so that he/she may control the message transmission request and the call request. Therefore, the method and the electronic device may prevent the activation of malicious applications such as SMiShing.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for blocking a message transmission or blocking a call transmission, the method comprising:
    recognizing, by a first electronic device, one of a request for the message transmission or a request for the call transmission;
    determining, by the first electronic device, whether the recognized request is generated in response to an occurrence of an event corresponding to a user's input;
    outputting, by the first electronic device, a pop-up window on a display if the recognized request is not generated in response to the occurrence of an event corresponding to the user's input; and
    determining, by the first electronic device, whether to either transmit the message or make the call to a second electronic device, in response to another input of the user applied to the pop-up window,
    wherein the user's input is an input requesting the call transmission or an input requesting the message transmission.

2. The method of claim 1, wherein the determining of whether the recognized request is generated in response to the occurrence of the event corresponding to the user's input comprises:
    recognizing, by the first electronic device, that the request is generated in response to the occurrence of the event corresponding to the user's input, when detecting that the first electronic device is one of gripped or held through a sensor and detecting the user's input operating a transmission key.

3. The method of claim 1, wherein the determining of whether the recognized request is generated in response to the occurrence of the event corresponding to the user's input comprises:
    recognizing, by the first electronic device, that the request is generated in response to the occurrence of the event corresponding to the user's input, when the request is generated by a user's confirmed application.

4. A non-transitory computer-readable storage medium storing instructions that, when executed, cause at least one processor to perform the method of claim 1.

5. An electronic device comprising:
    a communication interface configured to transmit a message and make a call;
    a display;
    a sensor configured to detect an occurrence of an event corresponding to a user's input; and
    at least one processor configured to:
        recognize one of a request for a message transmission or a request for a call transmission,
        determine whether the recognized request is generated in response to the occurrence of the event corresponding to the user's input through the sensor,
        output a pop-up window on the display if the recognized request is not generated in response to the occurrence of an event corresponding to the user's input, and
        determine whether to either transmit the message or make the call to another electronic device, in response to another input of the user applied to the pop-up window,
    wherein the user's input is an input requesting the call transmission or an input requesting the message transmission.

6. The electronic device of claim 5, wherein the at least one processor is further configured to:
    recognize that the request is generated in response to the occurrence of the event corresponding to the user's input, when detecting that the electronic device is one of gripped or held through the sensor, and
    detect the user's input operating a transmission key.

7. The electronic device of claim 5, wherein the at least one processor is further configured to recognize that the request is generated in response to the occurrence of the event corresponding to the user's input, when the request is generated by a user's confirmed application.

8. The electronic device of claim 5, wherein the at least one processor is further configured to:
    receive the message from an originator through a short message service center (SMSC),
    display contents of the received message on the display,
    determine whether to trace the originator according to the user's input applied to the sensor,
    transmit tracing information to the SMSC to trace the originator,
    receive source information corresponding to the originator, identified based on the tracing information, from the SMSC, and
    determine whether to block requests transmitted from the originator.

9. The electronic device of claim 8, wherein the tracing information comprises:
    a phone number of the originator, a unique device identification (UDI) of the originator, timestamps of the message when the message is transmitted and received, and a signal for tracing the originator created in the electronic device.

10. The electronic device of claim 8, wherein the at least one processor is further configured to:
    identify source information about the originator to block the requests transmitted from the originator, and
    block the requests based on the identified source information.

11. The electronic device of claim 8, wherein, when the at least one processor determines not to one of transmit the message or make the call, the at least one processor is further configured to terminate the recognized request.

* * * * *